United States Patent [19]

Kotok et al.

[11] 3,893,084

[45] July 1, 1975

[54] MEMORY ACCESS CONTROL SYSTEM

[75] Inventors: Alan Kotok, Waltham; Allan R. Kent, Framingham; David A. Gross, Acton, all of Mass.

[73] Assignee: Digital Equipment Corporation, Maynard, Mass.

[22] Filed: May 1, 1973

[21] Appl. No.: 356,118

[52] U.S. Cl. .......................................... 340/172.5

[51] Int. Cl...... G06f 13/08; G06f 7/04; G06f 11/12

[58] Field of Search ................................ 340/172.5

[56] References Cited

UNITED STATES PATENTS

| | | | |
|---|---|---|---|
| 3,328,768 | 6/1967 | Amdahl et al. | 340/172.5 |
| 3,377,619 | 4/1968 | Marsh et al. | 340/172.5 |
| 3,377,624 | 4/1968 | Nelson et al. | 340/172.5 |
| 3,555,515 | 1/1971 | Lee | 340/172.5 |
| 3,576,544 | 4/1971 | Cordero et al. | 340/172.5 |
| 3,599,159 | 8/1971 | Creech et al. | 340/172.5 |
| 3,609,697 | 9/1971 | Bleuins et al. | 340/172.5 |
| 3,771,146 | 11/1973 | Cotton et al. | 340/172.5 |
| R27,239 | 11/1971 | Ulrich | 340/172.5 |
| R27,251 | 12/1971 | Amdahl et al. | 340/172.5 |

*Primary Examiner*—Gareth D. Shaw
*Assistant Examiner*—Jan E. Rhoads
*Attorney, Agent, or Firm*—Cesari and McKenna

[57] ABSTRACT

A memory control for use in a digital computer system. During each memory reference certain use characteristics of the addressed location are monitored. These include the general accessibility of the location for any purpose, the availability of the location to certain users and operating restrictions which can be performed with information which the location contains. The control also monitors operational mode characteristics which indicate a class of operating programs being processed, whether the location contains an instruction or is for an operand and whether, in the case of an operand, a reading or writing operation is going to occur. If all the use and operational mode signals are comparable, the memory reference is allowed to continue. Otherwise it is aborted.

16 Claims, 3 Drawing Figures

MEMORY ACCESS CONTROL SYSTEM

BACKGROUND OF THE INVENTION

This invention relates to data processing systems generally and more specifically to memory units and their associated controls incorporated in such systems.

A data processing system operates in response to instructions which are grouped as "programs". At any given time the data processing system actually operates with either the entire program or a portion thereof located in a random access memory unit, commonly known as a main or core memory unit.

Many systems additionally include one or more secondary memory units for storing many programs. In these systems one or more programs, known as executive programs, control system operation while others, known as user programs, solve specific problems. Often times it is desirable to regulate the use of these programs in accordance with certain desired characteristics, such as the general accessibility of the program, its availability under certain circumstances and restrictions on its use. Each of these characteristics is most easily understood in terms of the following specific examples.

When a program is being written and checked for errors, it is highly desirable to prevent its use except under very controlled conditions. As another example, a system component might malfunction and alter the contents of a program thereby producing an error. If the program were processed, these resultant errors could adversely affect the operation of other programs. In these and other like situations, a program is normally designated "non-accessible"; other programs are implicitly designated "accessible".

Some data processing systems are adapted to serve multiple users. These systems, commonly known as "time-sharing" systems, actually only process one program at a time, but they intersperse component portions of programs for different users. As a result of the high operating speeds, several users thus appear to utilize the data processing system concurrently. Sometimes one user of a time-sharing system develops a program for solving some specific problem. He is willing to allow others to use this program, but he does not want to allow other users to know the instructions themselves. He, therefore, wants to restrict retrieval of these instructions from the main memory unit. Such programs are known as either "proprietary" or "concealed" programs while other programs, designated "public" programs, may be available without such restrictions.

The main or random access memory unit has the feature that information can be retrieved directly from any selected memory location and that the contents of any memory location may be altered by means of a "writing" operation. Sometimes it is desirable to prevent one program from causing the data processing system to alter the contents of another program in order to protect the program or promote operating efficiencies.

The control of a data processing system in accordance with these use characteristics is generally known as the "security" function. There are two reasons for implementing a security function. First, the system should prevent the programs of one user from operating improperly on or with executive programs or the programs of other users. Secondly, and conversely, the system should prevent the executive programs and programs of other users from operating improperly on or with the programs of the one user.

Prior data processing systems have provided this security function in several ways. As can be seen from the following discussion of several implementations, these schemes decrease system operating efficiency even when compromises in the security function are made to reduce the inefficiencies.

In one system, users are restricted to writing programs in high-level languages, such as BASIC or FORTRAN. A user cannot write directly in machine language (i.e., the set of instructions a central processor unit interprets without any translation). Hence, the executive and compiler programs, which are often written in machine language, can inherently provide the security function. However, restricting a user to writing only high-level language programs can lead to operating inefficiencies.

Other systems do enable a user to write machine language programs. In one such system, one portion of the main memory unit is dedicated to a "swapping" program which transfers other programs to and from the remaining portion of the main memory unit. The swapping program only allows programs of one user or executive programs to be actively stored in the main memory unit at one time. Thus, no one user can affect the programs of another user or the executive programs. While simple to implement, each swapping operation requires one or more transfers of information between the main and secondary memory units. These transfer times are significant and thus materially reduce system operating efficiency.

In another approach, the data processing system has two sections of main memory; one section stores user programs, and the other, executive programs. This system tends to prevent a program in one memory unit from operating improperly on or with a program in the other memory unit, but not on programs in the same memory unit.

In another arrangement, each user has his own virtual memory with a starting location 0. Relocation circuits convert each address in the virtual memory into a real address for a corresponding location in the main memory unit by indexing operations. In some of these systems, the data processing system aborts an operation if the converted address lies outside an allocated range of real addresses Another approach for producing real addresses from virtual addresses is known as page mapping. The virtual memory for each user is divided into pages and a "page map" contains correspondences between the virtual page number and the first real location of the corresponding page in the main memory unit. As each virtual address is converted, some systems determine whether the page is "accessible" or whether there are any restrictions in its use.

These systems, however, do not enable the space assigned to one user in the main memory unit to also store a proprietary program of another user with safeguards against the retrieval of instructions in the latter program. Furthermore, many of these systems only determine the accessibility of a memory location or restrictions on its use when an address for an instruction is being processed. In order to increase operating speeds, they often omit these characteristics as they apply to operand addresses.

Therefore, it is an object of this invention to provide a digital computer system which enables a specific set of memory locations to contain both proprietary and other programs.

Yet another object of this invention is to provide a validating circuit which monitors individual memory references.

Another object of this invention is to provide a data processing system which enables one user to employ a proprietary program but prevents that user from determining the instructions in the proprietary program.

Yet still another object of this invention is to provide a data processing system in which validating circuitry in the central processor unit monitors each memory reference without adversely affecting the overall operating efficiency of instructions.

Still another object of this invention is to provide a data processing system which enables a carefully written executive program to be stored without risk of being inadvertently altered by other programs.

SUMMARY

Normally, programs comprise a series of instructions and data which are stored in a sequence of locations in a memory unit. Sets of successive locations may also be grouped as pages. With a memory divided into pages, a reference to a specific location on a page for purposes of retrieving an instruction or data or of storing data usually requires the use of a "page map". A word in the page map identifies the location of the page and also certain characteristics about that page. For example, data in a "public" bit position tells whether a page is "public" or "concealed". While a user can read the contents of a public page, he normally cannot read instructions from a concealed page.

In accordance with one aspect of our invention, a "wired" validating circuit checks each memory reference and allows the reference to be made only if the reference is authorized. For example, if an instruction from a public page tries to read data from a concealed page in the memory unit, the validating circuit normally will prevent the reference from being made. However, if the first reference in the concealed page is for the purpose of retrieving a specific instruction, designated an "entrance" instruction, the validating circuit allows the reference to be made. This enables a user to execute a program on a concealed page. However, he cannot read any instructions or data which the concealed page contains.

As each memory reference must be validated, a data processing system in accordance with our invention has several advantages. The existence of the "entrance" instruction on each concealed program assures accountability because the user cannot bypass any accounting function. The person who writes the program on one or more concealed pages controls where others can begin to use the program by his placement of any entrance instructions. Further, the validating circuit assures that concealed programs are maintained proprietary. These accounting and security functions are performed independently of the supervisory program because the validating circuit is an integrally "wired" part of the data processing system.

This invention is pointed out with particularity in the appended claims. A more thorough understanding of the above and further objects and advantages of this invention may be attained by referring to the following description taken in conjunction with the accompanying drawings.

DESCRIPTION OF AN ILLUSTRATIVE EMBODIMENT

In order to provide a meaningful and concise description of this invention, we elect to describe the invention in terms of an improvement to a specific data processing system, namely a PDP-10 Data Processing System which Digital Equipment Corporation, the assignee of this invention, manufactures and sells. We do not discuss system signals which correspond to signals in prior systems, such as control signals which the system uses to transfer the data to memory locations and control signals used during the execution of normal operating instructions. A further discussion of these and other signals appears in KA-10 Central Processor Maintenance Manual, Vols. 1 and 2 which Digital Equipment Corporation published in 1968.

In the following discussion, a "+1" or positive voltage represents a TRUE or logical ONE condition. A ground or "0" potential represents a FALSE or logical ZERO condition. It is assumed that all data and control lines are normally held in the "FALSE" condition. In accordance with this description, therefore, the output of an AND circuit is positive (i.e., TRUE) when all the inputs are positive (i.e., TRUE). Similarly, the set (Q) output of a flip-flop is positive (i.e., TRUE) when the flip-flop is set. With respect to clocked flip-flops, it is sufficient to know that a clocked flip-flop assumes a state corresponding to the signal at a D input in response to a clocking pulse at a C input.

Figure 1:
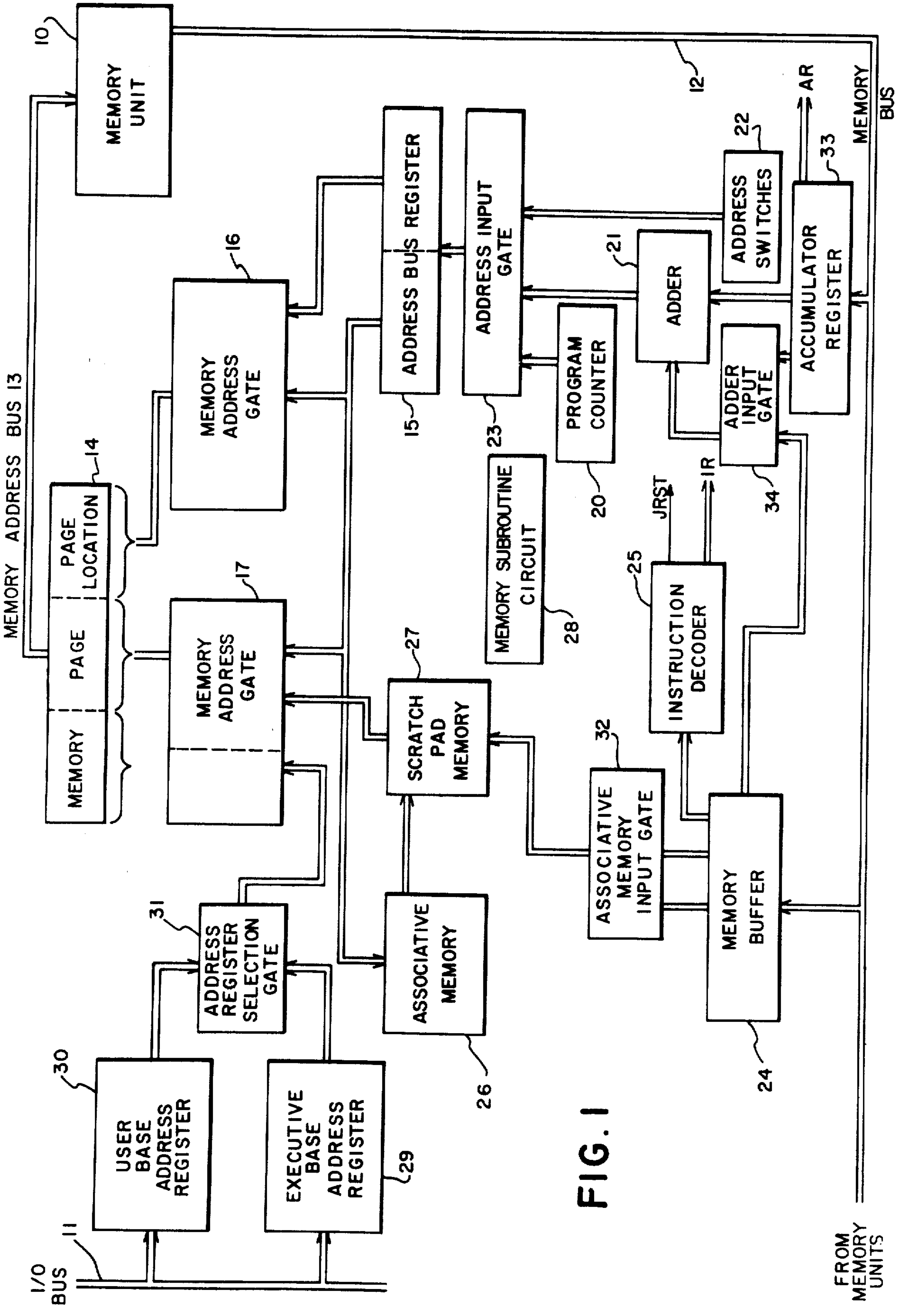
FIG. 1 is a schematic diagram of a portion of a data processing system adapted to incorporate our invention.

FIG. 1 is a block diagram of elements in a central processor unit, such as the central processor unit in a PDP-10 data processing system, which are necessary for an understanding of the invention. The central processor unit connects to a bidirectional input/output (I/O) bus 11, a memory bus 12 for supplying data from a main memory unit 10 to the central processor unit and a memory address bus 13 for supplying an address to the memory unit 10.

During its operation, the central processor unit, through conventional control circuits, performs "memory subroutines" to retrieve instructions or data from, or store data in, prescribed memory locations. Addresses for these locations come from an address generator including a memory address register 14 which receives address information from several sources. One such source is an address bus register 15 which supplies an address directly to the memory address register 14 through a memory address register gate 16 and a memory address register gate 17.

A program counter 20, an adder 21, which can manipulate data to produce an address, and address switches 22, normally found on a console and controlled by a system operator, can each be selected as an input to the address bus register 15. An address input gate 23 couples an appropriate one of these address sources to the address bus register 15 in response to various control signals, as known in the art. Typically, the program counter 20 provides a memory address to locate a specific instruction, while the adder 21 supplies an operand address derived from the instructions. The contents of an addressed location, defined by signals on the memory address bus 13, appear on the memory bus 12 and are received by a memory buffer 24. An instruction decoder 25 connected to the memory buffer 24 produces a number of IR signals which are related to the operand or function code and identify the particular function the central processor unit is to perform, such as a specific arithmetic or logic operation.

When a central processor unit is used in a data processing system for time-sharing applications, there are two groups of people who can operate the system. First, there is the system operator who is located physically at the data processing system site. The second group comprises "users." Only one user actually operates or uses the data processing system at any given time, but, because of the system's operating speed, concurrent users operate apparently simultaneously under control of an "executive" program.

One problem the executive program must prevent is the interference of one user with another. The PDP-10 data processing systems, in part, use "virtual addressing" techniques to keep users separated. With "virtual addressing" each user has virtual memory space starting at location 0. One function of the executive program is to "map" or translate each virtual address into a unique physical address in the main memory 10. Each instruction has a predetermined number of bits to designate an address. For example, a PDP-10 instruction has an eighteen-bit address, so it can identify any of $1000000_8$ locations (i.e., locations $\mathbf{000000_8}$ through $\mathbf{777777_8}$). Usually, the main memory unit 10 will contain a greater number of locations than that the average user requires to increase overall operating efficiencies. For purposes of this discussion, we assume that the main memory unit 10 may have up to $\mathbf{20000000_8}$ locations (i.e., locations $\mathbf{0000000_8}$ through $\mathbf{7777777_8}$). The mapping function must convert each virtual address into a real address which may require the address to be expanded.

With respect to a running program using virtual addresses, "page mapping" provides the expanded address. Virtual addresses are segregated into "pages." In the specific embodiment, we use a page containing 512 memory locations so that a nine-bit address defines a relative location on a virtual page and a corresponding physical page. The remainder of the virtual address is a virtual page number, so in the specific embodiment a user has 512 pages defined by a nine-bit page number, each page containing 512 locations. This a memory of $1000000_8$ locations.

When the central processor unit processes a virtual address, the memory address register gate 16 passes the location on the virtual page (i.e., the least significant nine-address bits) from the address bus register 15 into a "page location" section in the memory address register 14. The virtual page number passes into an associative memory 26. The associative memory 26 tries to find within itself a location containing the virtual page number. When it does, the associative memory 26 couples to a "scratch pad" memory 27 a signal representing the address of that page number in the associative memory 26. The corresponding address in the scratch pad memory 27 contains a page map word which includes a thirteen-bit physical address locating in the main memory unit 10 the physical page corresponding to the virtual page. This address passes from the scratch pad memory 27 through the memory address register gate 17 into the most significant thirteen-bit positions of the memory address register 14 to serve as memory and page sections. The resulting 22-bit address, therefore, comprises the concatenation of physical or real page address derived from the virtual page number and the virtual page address within the page; and a memory subroutine circuit 28, which is part of the control for the central processor unit, provides the necessary control signals in response to the formation of an address to retrieve the instruction or read data from or transfer data to the memory unit 10, provided the reference is validated. Memory subroutine circuits are known in the art.

The associative memory 26 and scratch pad memory 27 have a limited capacity. They may not contain all the correspondences between the virtual and physical page number for even a single user of the system. When the associative memory does not contain a virtual page number supplied from the address register 15, the memory subroutine circuit 28 causes the proper information to be obtained from a section of the main memory unit 10 where complete paging information is stored. The location for the updated information is obtained by concatenating data stored in a user base address register 30 and coupled through a selection gate 31 with the desired virtual page number from the address bus register 15. The resulting main memory location contains the needed page map word. The virtual address is then stored in the associative memory 26 while the corresponding page map word is routed to the scratch pad memory 27 from the main memory unit 10 over the memory bus 12 and through the memory buffer 24 and associative memory input gate 32. Then the central processor unit tries again to convert the virtual address into a physical address.

Of course there must be some overriding control system which coordinates all the activity of the central processor unit 10 and its interaction with other units in the data processing system. In most data processing systems a group of control programs provide the coordination. When the central processor unit is operating on these control programs, it is said to be in the "executive mode" and memory pages containing the control or executive programs are designated as executive pages. There are two types of executive programs: "kernel" and "supervisory." A kernel program is a small, well-written program which exercises overall system control. Memory references from instructions in the kernel program can reach any location in the portion of the main memory unit 10 which stores an executive program. They are the only instructions which can reach a first section of the executive program space. Further, there are no restrictions on the use of instructions in the kernel program. The kernel program, in addition, handles all input/output operations, controls the information in and location of page map words, trap locations, interrupt locations and performs other similar functions as known in the art. To protect the kernel program, only the system operator or the kernel program itself can cause the system to write into the locations containing the kernel program.

The second type of executive program is the supervisory program. It can only make paged references, and while it can read a kernel program, it cannot alter it. The supervisory program performs many functions, as known in the art. In terms of this invention, it monitors the various input/output devices, determines information about particular users, and controls the time the central processor unit operates on a user program and the specific locations of that user program in memory. If a malfunction occurs during the operation of a program, the supervisory program detects the failure, analyzes it, and either corrects it or provides other information about the malfunction.

As indicated, executive and user programs are stored in separate physical areas of the memory unit. The central processor unit operates on each independently. However, there are times when it is desirable to link executive and user programs. For example, when a user program obtains data which is to be transferred to an output device, it must call for an executive routine to perform the operation. There are a series of crosslinking instructions designated as XCTP instructions which allow the executive program to obtain the data from the user page involved using the user virtual addressing so as to facilitate its handling.

Figure 2:
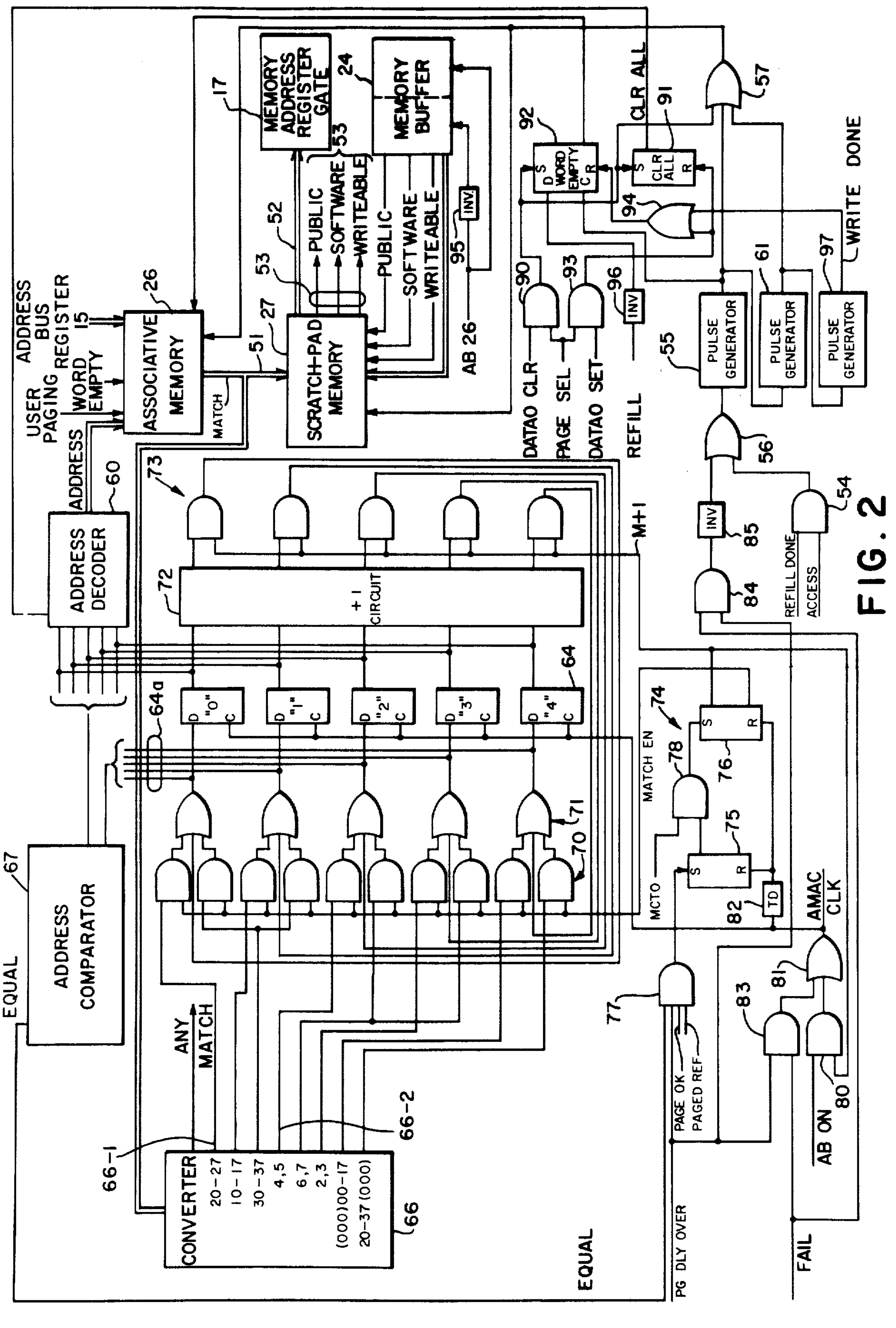
FIG. 2 schematically depicts a portion of a memory address control circuit for operating in a system incorporating our invention.

In order to describe the details of the specific embodiment of this invention in light of this background information, we show the essential addressing circuitry in detail in FIG. 2. Although this invention is applicable to many different addressing schemes, a more detailed discussion of this particular addressing system simplifies an understanding of the validating operation.

The central processor unit 10 also contains other elements and performs other operations. For purposes of understanding the invention, it is only necessary to know about some of them. When instruction, address, or data signals appear on the memory bus 12, both the memory buffer 24 and an accumulator register 33 may receive the signals. The accumulator register 33 produces various AR signals corresponding to the contents of a specified bit location. For example, an AR(05) signal represents the contents in a "05" bit position in the accumulator register 33. Hence, in accordance with the convention we are using in this description, the AR(05) signal is positive and TRUE when the "05" bit position in the accumulator register 33 contains a ONE. Signals from the memory buffer 24 may also pass to the adder 21 through an adder input gate 34 which also receives signals from the accumulator register 33.

A. ADDRESSING OPERATIONS

As previously indicated, the scratch pad memory 27 contains only a relatively few page map words identifying physical page locations in main memory unit 10. In our specific embodiment, each page map word includes the thirteen-bit physical page number and information concerning use characteristics about the page, such as in:

i. An "access bit" position which contains a ONE when the page can be retrieved. When this position contains a ZERO, no user can gain access to that page for any purpose whatever.

ii. A "public bit" position which contains a ONE when relatively unlimited access is allowed; a ZERO indicates the page contains a concealed program in the user mode.

iii. A "write bit" position which contains a ONE when a program may write into locations on the page. A ZERO indicates that the program can only retrieve data or instructions from the page.

1. Associative and Scratchpad Memory Operation a. Normal Operation

Now referring to FIG. 2 and considering the operation of that circuit with a single user, as previously described the virtual page number from the address bus register 15 enters the associative memory 26. Assuming that the associative memory 26 contains that same virtual page number, one of a plurality of MATCH conductors 51 is energized. This enables the scratch pad memory 27 to transfer a page address portion of a corresponding page map word onto a bus 52 for subsequent loading into the memory address register 14 (FIG. 1) through the memory address register gate 17 and to transfer the control bits onto a set of control conductors 53 as use characteristic signals for the circuitry of FIG. 3 and other control circuits not shown.

b. Page Refill Cycle

There are two exceptions to this sequence. In one, no match signal appears on the bus 51. When this occurs, it merely means that the associative memory 26 does not contain the designated virtual page number. The memory subroutine circuit 28 in the central processor unit then merely retrieves the appropriate page map word from the memory unit 10 which contains all the page mapping information and updates the associative memory 26 and scratch pad memory 27. This is a "refill cycle." During the refill cycle, the memory subroutine unit 28 (FIG. 1) loads the page map word address onto the memory address bus 13, obtains the map word and loads it into the memory buffer 24. When this is done, the "access" bit in the retrieved page word is examined. If the page map word designates an accessible page (i.e., an ACCESS signal is TRUE) an AND circuit 54 (FIG. 2) enables a first pulse generator 55 through an OR gate 56. The output of the pulse generator 55 passes through another OR gate 57 as a first write pulse applied to both the associative memory 26 and scratch pad memory 27. The first pulse has no effect on the scratch pad memory 27 as there is no enabling output from the associative memory 26. However, the pulse loads the virtual page address on the bus from the address bus register 15 into an associative memory location identified by ADDRESS signals from an address decoder 60. This then produces an enabling MATCH signal on one of the conductors 51. The pulse generator 55 additionally enables a second generator 61 to pass a second write pulse through the OR gate 57. At this point, since there is a match, the pulse enables the page map word stored in the memory buffer 24 to pass into the scratch pad memory 27. This write pulse does not alter the contents of the associative memory 26. When the refill cycle has thus finished, the addressing operation can recycle.

It is, of course, desirable to store a new page map word and virtual address in an associative memory location which has probably not been used recently, since the addresses stored in those locations are the ones in the memories 26 and 27 least likely to be needed in the near future. This location in the associative memory 26 is supplied by a counter 64. The address decoder 60 converts the output from the counter 64 into the appropriate signals to specify a location in the associative memory 26. If the associative memory 26 contains thirty-two locations, then a five-bit binary register can be used. Each time a MATCH signal appears on the bus 51, a converter 66 produces a plurality of output signals corresponding to the match location. Each output signal represents an area or group of related locations. For example, a "20–27" output line (66–1) indicates that the match is at one of the locations from $20_8$ through $27_8$. Similarly, a match on the "4–5" line (66–4) indicates a match with one of the locations 4, 5, 14, 15, 24, 25, 34, or $35_8$. These signals pass to a gating circuit 70 which supplies an input to an address comparator 67 and counter 64 through a set 71 of OR gates. The outputs of the counter 64 are coupled both to the address comparator 67 and an incrementing (+1) circuit 72 which, in turn, provides a third input to the OR gate set 71 through a set of AND gates 73. Basically this circuit compares the address from the converter 66 which is coupled to the input of the counter 64 to see if it is the same address the counter designates. If it is, the content of the counter 64 is incremented and the counter 64 receives the new value. As a result, the counter 64 addresses a location which was not recently used. With successive operations, the counter 64 tends to be altered until it points to a location which has not been used at all or has not been used recently.

This entire counter circuit is under the supervision of a control circuit 74 which transmits an AMAC CLK signal to change the contents of the counter 64 and mutually exclusive M+1 and MATCH EN signals to control the source of data for the counter 64.

Each time a match occurs, the address comparator 67 monitors the input and output of the counter 64 by means of signals from the address decoder 60 and an encoder comprising the converter 66, the AND gate set 70 and the OR gate set 71. If the location designated by the bus 51 and the location identified by the counter 64 are the same, the address comparator 67 generates an EQUAL signal. The control circuit 74 responds and modifies the contents of the counter 64.

Specifically, control circuit 74 includes two latches 75 and 76. The latch 75 sets in response to a signal from an AND gate 77 which receives the EQUAL signal plus three other control signals. One is a PG DLY OVER signal indicating that the paging operation is complete. A PAGED REF signal indicates that a reference has been made on a page while a PAGE OK signal from the circuitry in FIG. 3 indicates that a valid memory reference has been made. Under these circumstances. the AND gate 77 sets the latch 75. Subsequently, a timing signal (herein identified by an MCTO signal) passes through an AND gate 78 enabled by the latch 75 to set the latch 76. Setting the latch 76 produces the M+1 signal which enables the gating network 73 to couple the output from the counter 64 through the set of gates 72 thereby incrementing the count and storing it back in the counter 64 on a subsequent AMAC CLK pulse.

The control circuit 74 also generates the AMAC CLK pulse whenever a reference is made to an associative memory location identified by the counter 64. Whenever the latch 76 sets, thereby generating the M+1 signal, it enables an AND gate 80. A fixed time delay after data appears at the output of the address bus register 15, conventional addressing circuitry in the memory subroutine control circuit 28 transmits an AB ON pulse. The AND gate 80 couples that pulse to an OR gate 81 to transmit the AMAC CLK pulse and clocks all the stages in the counter 64 to load the data which, in this case, is the incremented address. A time delay circuit 82 also receives the AMAC CLK signal to reset the latches 75 and 76 thereby disabling the M+1 signal and the AMAC CLK pulse generator.

When the latches 75 and 76 are reset, the latch 76 generates the MATCH EN signal.

c. Page Failure

Figure 3:
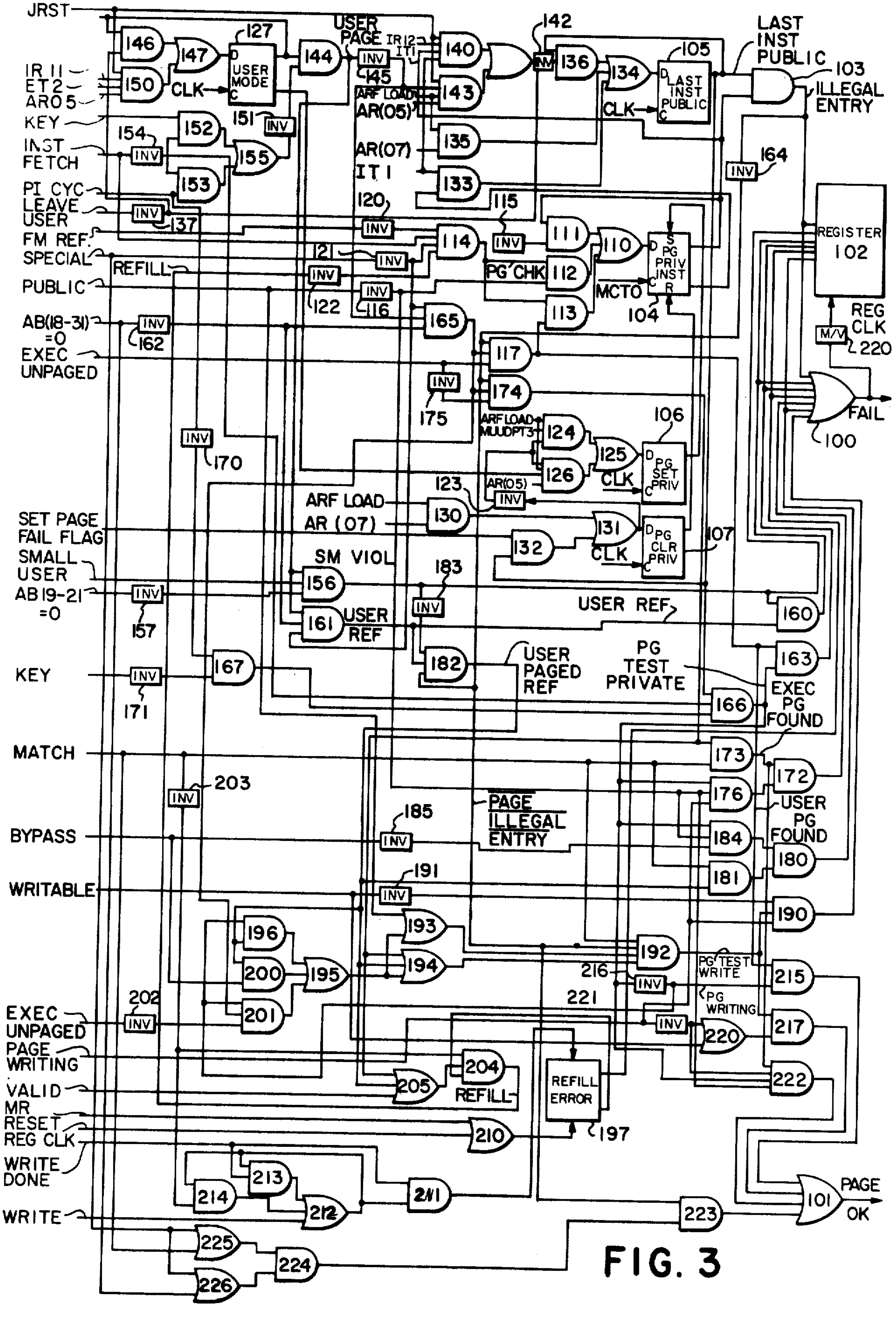
FIG. 3 is a schematic diagram of a validating circuit.

The second exception to the normal addressing cycle may occur if there is a match, but the circuitry in FIG. 3 does not validate the memory reference. However, a valid reference may be possible if the supervisory program can alter the page map word. Under these circumstances, it is desirable to merely rewrite the page map word in the existing locations. To do this, the counter 64 must be changed to point to that location. An AND gate 84 receives the PG DLY OVER signal and a FAIL signal from the circuitry in FIG. 3. After a time delay, defined by a time delay circuit 85, the signal from the AND gate 84 energizes the first pulse generator 55. As described more fully later, the pulse generator 55 also sets a WORD EMPTY latch 92 which prevents a MATCH signal from occurring. The successive pulse from the generator 61 therefore does not alter the contents of the scratch pad memory 27. Now the supervisory program can alter the page map word as appropriate. When the next reference is made, a normal page refill cycle occurs.

For example, often times a page is stored in a disk memory unit and it normally is only "read." In that case, the page map word corresponding to the program would contain a ZERO in the WRITE bit position of the page map word. This improves overall system efficiency because if a program is only to be read, it is not necessary to transfer the page back to the disk memory unit, thereby saving a disk transfer operation. If, an otherwise authorized person tries to write on that page, a page failure occurs. However, the supervisory program can merely change the WRITE bit in the page map word and enable the operation to occur again. Thereafter, the monitor would write the page onto the disk.

d. Multiple User Operation

As previously noted, all page map words for a user are stored in the memory unit. There is a "page map" in the memory unit for each user in a multi-user system. As a result it is necessary to change active data in the associative memory 26 and scratch pad memory 27 each time the users change. As is also evident, the contents must also change when operating modes change.

When the supervisory program changes users, it terminates the current user and then starts the new user. To terminate the current user, other conventional control circuits in the central processor unit generate a PAGE SEL signal and a DATAO CLR signal. These two signals energize an AND gate 90 (FIG. 2) and set a CLR ALL latch 91 and a clocked WORD EMPTY flip-flop 92. When the CLR ALL latch 91 sets, the address decoder 60 activates all addresses which, in combination with the reset output from the WORD EMPTY flip-flop 92, effectively clears the associative memory 26. Specifically, each location in the associative memory stores a nine-bit address plus a tenth for control which must be set (i.e., contain a ONE) to obtain a match. The unique address plus a WRITE signal from the AND gate 90 and OR gate 57 resets this bit in all locations. Thereafter, no address from the address bus register 15 can produce a match.

The memory subroutine unit 28 (FIG. 1) loads a new address into the user base address register 30, or the executive base address register 29 if operating in the executive mode, and transmits PAGE SEL and DATAO SET signals to update a page map word. Referring to FIG. 2, a signal from an AND age 93, which receives the PAGE SEL and DATAO SET signals resets the CLR ALL flip-flop 91 and, by means of an OR gate 93, the WORD EMPTY flip-flop 92. When the next memory reference is made, no MATCH signal is transmitted from the associative memory 26 because all the control bits are reset. However, the resulting refill cycle writes a ONE into that position (i.e., sets the control bit) because the WORD EMPTY flip-flop 92 is now reset and applies a ONE to the control bit input. Successive references and refill cycles update other locations and set the respective control bits.

Still referring to FIG. 2, the address and other bits in a page map word may only require eighteen bits. In a PDP–10 system, with thirty-six bit words, each memory location stores two page map words, so there are 512 page words in 256 locations. The least significant bit in the virtual page address appears on an AB (26) bus line. If it is ZERO, indicating an even numbered virtual page, an inverter 95 enables the left-half of the memory buffer to transfer a word into the scratch pad memory 27. On the other hand, if the page map word corresponds to the odd numbered page locations, the ONE bit on the AB (26) bus line enables the word in the right half of the memory buffer 24 to be loaded into the scratch pad memory 27.

As previously indicated, the WORD EMPTY flip-flop 92 is also set in response to an output from the pulse generator 55 if the central processor unit is not in the refill cycle. An inverter 96 couples the REFILL signal to the data input of the WORD EMPTY flip-flop 92. If the system is not in the refill cycle the WRITE pulse from the pulse generator 55 sets the WORD EMPTY flip-flop 92 and resets the control bit position in the associative memory unit 26. After the pulse generator 61 produces the second WRITE pulse, which has no effect, a third pulse generator 97 produces a WRITE DONE pulse which passes through the OR gate 94 and directly resets the WORD EMPTY flip-flop 92 for subsequent operations.

The foregoing address operations occur each time the system makes a memory reference. With each memory reference, the circuitry in FIG. 3 also validates the referenced location if the page which has been obtained is a proper one for the designated operation.

Validating Operations

There are a number of conditions which constitute invalid memory references. When any of these occur, an OR gate 100 shown in FIG. 3, produces the previously discussed FAIL signal. An express positive indication of a valid page is produced by another OR gate 101 which transmits a PAGE OK signal.

There are several conditions which cause the OR gate 100 to transmit the FAIL signal and they are considered in more detail below. Whenever the OR gate 100 transmits a FAIL signal, the memory subroutine circuit 28 (FIG. 1) aborts the reference. A flag is set so the supervisory program can monitor the contents of a register 102 and either correct the reasons for the failure or produce error messages to either the system operator or user. These operations are known in the art.

In the following discussion, reference is made to JRST, MUUO and specific AR signals. An instruction decoding network generates a JRST signal in response to a JRST instruction. When the JRST instruction has a ONE bit in bit position 11 (i.e., AR (11)=1), an ARF LOAD signal is generated and causes various flags or flip-flops to be restored. A program control (PC) word is retrieved in response to such a JRST instruction and the signals derived from the PC word are important to an understanding of the invention. A ONE in bit position 5 (i.e., AR(05)=1) causes the central processor unit to operate in the user mode while a ZERO causes it to operate in the executive mode. An AR(07) bit position controls whether the mode is public, a ONE designating a public mode while a ZERO designates a concealed mode. These two bit positions together control the exact operating conditions which are important to an understanding of the invention. Specifically, the operating mode conditions are:

| PC Word AR(05) | PC Word AR(07) | Operating Mode |
|---|---|---|
| 1 | 1 | User - Public |
| 1 | 0 | User - Concealed |
| 0 | 1 | Executive - Supervisory |
| 0 | 0 | Executive - Kernel |

It is also possible for the supervisor programs to alter the state of various flags. As also known, in a PDP–10 digital computer system, the supervisory program can include a number of programmed operators. Control circuits, not shown, respond to these operators by transmitting a MUUO signal.

B. Page Failures

Each of seven conditions which produce a FAIL signal are now discussed.

1. Illegal Entry

In FIG. 3, an AND gate 103 transmits an ILLEGAL ENTRY signal whenever a memory reference tries to retrieve an instruction from a concealed page in the memory unit (i.e., when a PG PRIV INST flip-flop 104 is set) and the preceding instruction was retrieved from a public page (i.e., when a LAST INST PUBLIC flip-flop 105 is set) except under certain prescribed situations. These two flip-flops are constantly being updated by system CLK pulses in the case of the LAST INST PUBLIC flip-flop 105 and by MCTO pulses in the case of the PG PRIV INST flip-flop 104. The central processor unit transmits a MCTO pulse once during each fetch state when an instruction is being retrieved. In addition, signals from a PG SET PRIV flip-flop 106 and a PG CLR PRIV flip-flop 107 can directly set and reset, respectively, the PG PRIV INST flip-flop 104.

Referring first to the PG PRIV INST flip-flop 104, a MCTO pulse sets it if an OR gate 110 receives a TRUE signal from any of AND gates 111, 112 or 113. All of these AND gates are enabled in response to a signal from an AND gate 114 which produces a PG CHK signal. Specifically, the PG CHK signal, indicating a proper time to check a page reference during a memory subroutine, enables the AND gates 112 and 113, but disables the AND gate 111 by virtue of being coupled through an inverter 115.

The AND gate 112 also receives the PUBLIC signal from the bus 53 (FIG. 2) through an inverter 116. Hence any time the PUBLIC signal is FALSE, indicating a concealed page, the AND gate 112 provides an input to the PG PRIV INST flip-flop 104 which enables it to set on the next MCTO pulse.

One the PG INST flip-flop 104 sets, it remains set by virtue of a feedback through the AND gate 111 which is enabled as soon as the PG CHK signal becomes FALSE. The PG CHK signal transition occurs between successive MCTO pulses so no ambiguities can exist. When a next instruction is retrieved, the PG CHK signal is again asserted, thereby disabling the feedback path and enabling the update of the flip-flop 104.

The PG PRIV INST flip-flop 104 also sets during the time the PG CHK signal is asserted if and AND gate 117 is energized. This occurs, as described later, if there is an unpaged reference made to the memory unit.

There are four inputs to the AND gate 114 which determine the status of the PG CHK signal. Basically, the PG CHK signal is TRUE during the fetch state (i.e., an INST FETCH signal is TRUE). However, during the state it is possible to bypass or disable the PG CHK signal. For example, some systems may include a fast-acting memory section which is totally dedicated to a currently active user. A FM REF signal is TRUE during any such reference so an inverter 120 causes the PG CHK signal to become FALSE. At certain times it is necessary to alter a process table containing certain control information such as the complete page mapping and base register information. A SPECIAL signal is TRUE when this occurs, and an inverter 121 causes the PG CHK signal to become FALSE. As previously note, it is sometimes necessary to update the contents of the associative and scratch pad memories 26 and 27 (FIG. 2). When this occurs, a REFILL signal is TRUE and an inverter 122 causes the PG CHK signal to become FALSE.

The PG SET PRIV flip-flop 106 sets the PG PRIV INST flip-flop 104 directly when the central precessor unit processes one of the MUUO program operators. Assuming a signal to an inverter 123 is FALSE, and AND gate 124 and OR gate 125 couple a TRUE signal to the data (D) input of the flip-flop 106. The PG PRIV INST flip-flop 104 then sets immediately.

The PG SET PRIV flip-flop 106 is also set when the system is operating in the executive mode. This is indicated when a USER MODE flip-flop 127 is reset and the PC word is being loaded as indicated by a TRUE ARF LOAD signal. This occurs when the system shifts to the concealed mode (i.e., the AR (05) bit position has a ONE and the AR (07) bit position has a ZERO).

Both of these conditions which set the PG SET PRIV flip-flop 106 allow either a user program or a supervisory program to effect a change to kernel or concealed mode.

Under certain conditions or changes in operating mode, the PG CLR PRIV flip-flop 107 directly resets the PG PRIV INST flip-flop 104. For example, during a transfer to a user public mode or supervisory mode with both the ARF LOAD and AR (07) signals TRUE, an AND gate 130 and OR gate 131 enable a succeeding system CLK pulse to set the PG CLR PRIV flip-flop 107. The OR gate 131 also disables both sources of signals to the D input of the PG SET PRIV flip-flop 106. The other source of a clearing signal is an AND gate 132. Whenever a preceeding instruction comes from a public page (i.e., the LAST INST PUBLIC flip-flop 105 is set), the central processor unit may generate a SET PAGE FAIL FLAG signal which indicates that the PG PRIV INST flip-flop 104 should be reset. When this occurs, the AND gate 132 enables a succeeding CLK pulse to set the PG CLR PRIV flip-flop 107.

There are two ways to set the LAST INST PUBLIC flip-flop 105 and two ways to reset it. If the PG PRIV INST flip-flop 104 is reset during an ITI time state, which occurs after an instruction state terminates, an AND gate 133 and OR gate 134 produce an asserted signal at the D input so a following CLK pulse sets the LAST INST PUBLIC flip-flop 105.

The second way to set the LAST INST PUBLIC flip-flop 105 is to change from a non-public or concealed mode to a public mode in either a user or executive mode. Whenever this occurs, the ARF LOAD and AR (07) signals are TRUE. A TRUE signal from an AND gate 135 passes through the OR gate 134 to enable the LAST INST PUBLIC flip-flop 105 to set with the next CLK pulse.

Once set, the LAST INST PUBLIC flip-flop 105 tends to remain set by means of a normally enabled feedback path through an AND gate 136. If either of a LEAVE USER or a LIP CLR signal become TRUE, however, the AND gate 136 is disabled, and a succeeding CLK pulse resets the LAST INST PUBLIC flip-flop 105.

The LEAVE USER signal becomes TRUE whenever the ARF LOAD and MUUO signals are TRUE. This is the same condition which sets the PG SET PRIV flip-flop 106. The LEAVE USER signal also becomes TRUE when an operation is to be controlled from the console unit or when the central processor unit begins to process an interruption subroutine. Whenever the LEAVE USER signal does become TRUE, an inverter 137 disables the AND gate 136 30 the LAST INST PUBLIC flip-flop 105 resets.

An OR gate 141 produces the LIP CLR signal which an inverter 142 couples to the AND gate 136. If, as previously discussed, the PG PRIV INST flip-flop 104 is set, then an AND gate 140 energizes the OR gate 141 if, during the IT1 time state, the retrieved instruction is a JRST INSTRUCTION and the IR(12) bit position contains a ONE. A JRST instruction with a ONE in bit position 12 is an "entrance instruction." This means that if a prior instruction on a public page transfers the operation to a concealed page and the first instruction is an entrance instruction, the AND gate 140 permits the transfer to occur because it disables the AND gate 136. As a result, the LAST INST PUBLIC flip-flop 105 resets and no ILLEGAL ENTRY signal is produced. A transfer to a location which does not contain an entrance instruction produces the ILLEGAL ENTRY signal because the LAST INST PUBLIC flip-flop 105 remains set.

Transfers to the concealed mode are also possible from either a kernel mode or a supervisory mode. Each transfer must be effected by a JRST instruction. When the ARF LOAD signal is asserted, the AR(05) bit position contains a ONE and the system is in the executive mode. An AND gate 143 energizes the OR gate 141 so the next CLK pulse resets the LAST INST PUBLIC flip-flop 105 (assuming AR (07) is FALSE so AND gate 135 is not energized). In the meantime the USER MODE flip-flop 127 has also been set so the machine is now in concealed mode.

The USER MODE flip-flop 127 provides the USER PAGE signal by energizing a normally enabled AND gate 144, an inverter 145 providing the appropriate signal for the AND gate 143. Once set, an AND gate 146 provides a feedback loop through an OR gate 147 so long as the system remains in the User mode. The feedback loop is broken when the LEAVE USER signal is asserted as the inverter 137 normally enables the AND gate 146.

If the USER MODE flip-flop 127 is reset, then the transfer back to a USER mode, in response to a JRST instruction with a ONE in bit position 11 and in the AR (05) bit position, enables a CLK pulse to set the flip-flop 127. This occurs during an ET2 time state.

The AND gate 144 is disabled by a signal from an inverter 151. This disabling function may occur at times other than an instruction fetch state. During that state an INST FETCH signal, coupled to AND gates 152 and 153 by an inverter 154, disables both AND gates 152 and 153. As a result an OR gate 155 and the inverter 151 provide an enabling input to the AND gate 144. During other times when the INST FETCH signal is true, the OR gate 155 continues to enable the AND gate 144 unless the central processor unit control transmits a KEY signal, indicating an operation is occurring from the central console, or a PI CYC signal, indicating that the central processor unit is operating in priority interruption cycle. Either condition disables the AND gate 144 to indicate that the system is in the executive mode.

2. Small User Paging Error

Oftentimes a user does not require a full virtual memory for a particular program so a portion of the page map space could remain unused. This can be very inefficient from a storage standpoint, especially if a large number of small users are to be accomodated. For purposes of this discussion, we designate a program requiring fewer than 16k locations to be a "small" program; the user of such a small program is designated as a "small user."

The supervisory program can allocate unused portions of a small user's page map for other purposes, such as storing the user's state while not running, since the hardware protects these areas from being interpreted as map words. In the specific embodiment, the supervisory program can allocate locations 0 through $\mathbf{037777_8}$ and $\mathbf{400000_8}$ through $\mathbf{437777_8}$ to a small user. When the small user is in control of the system, the supervisory program causes circuitry in the central processor unit to transmit a SMALL USER signal. While the SMALL USER signal is being transmitted, no address to the small user memory locations contains a ONE in the second through fourth most significant bit positions, so an AB(19-21)=0 signal is TRUE during a valid reference to a small user area of the virtual memory.

Whenever the central processor unit is operating in a user mode, for any user, the USER PAGE signal from the AND gate 144 is a first enabling input to an AND gate 156. If, in addition, the user is a small user, the resulting SMALL USER signal is a second enabling signal. If the address is a valid address, then the AB(19-21)=0 signal is TRUE, so an inverter 157 disables the AND gate 156 and it cannot produce a SM VIOL signal. If any of bit position 19 through 21 in the address contains a ONE, then the address is invalid. The AB(19-21)=0 signal is then FALSE and the inverter 157 energizes the AND gate 156.

The SM VIOL signal is one input to the register 102. In order to produce the FAIL signal both the SM VIOL signal and a USER REF signal must energize an AND gate 160, the output of which goes to the OR gate 100. The USER PAGE signal is a first enabling signal to an AND gate 161 which, when energized, transmits the USER REF signal. An AB (18-31)=0 signal is always FALSE if a ONE appears in any of these bit positions in an address. Hence, an inverter 162 produces another enabling signal for the AND gate 161 whenever a memory address appears. The AND gate 161 is disabled during a SPECIAL instruction by the output from the inverter 121 which receives the SPECIAL signal.

Hence, the coincidence of the SM VIOL and USER REF signals causes the OR gate 100 to produce the FAIL signal. Further, the existence of the FAIL and SM VIOL signals indicates that a small user has made a reference to an area of the memory outside that allocated for the small user.

3. Executive Mode Errors

If the central processor unit is operating in an executive supervisory mode and attempts to make a reference to an unpaged, and therefore non-public, location, an AND gate 163 causes the OR gate 100 to transmit the FAIL signal. The register 102 also receives the signal. By definition, this is a reference to the area storing the kernel program or a proprietary user program.

The AND gate 117 provides one input to the AND gate 163. An EXEC UNPAGED signal, another operating mode signal, indicates that the central processor unit is operating in the unpaged executive mode. This signal and a signal from an inverter 164, which is asserted if the reference does not produce the ILLEGAL ENTRY signal, enable the AND gate 117 to monitor the output from an AND gate 165. With the central processor unit in the executive mode, the inverter 145 transmits a TRUE signal. If the inverter 121 transmits a TRUE signal, the AND gate 165 is energized if any of bit positions 18–31 on the address bus contains a ONE (i.e., the AB(18-31)=0 signal is FALSE). Whenever the AND gate is energized under these conditions, the AND gate 117 enables the AND gate 163.

The second input to the AND gate 163 is a PG TEST PRIVATE signal from an AND gate 166. The AND gate 166 receives three signals. A first signal is asserted when the LAST INST PUBLIC flip-flop 105 is set. The inverter 154, which transmits a TRUE signal when a memory reference is being made to an operand address, provides a second signal. The third signal from an AND gate 167 is TRUE when the system is not in a priority interruption cycle or is not responding to some entry from the console. The former condition is indicated by a signal from the inverter 170, which receives a PI CYC signal, and the latter condition is indicated by a signal from an inverter 171, which receives a KEY signal indicating a console operation. When all three signals are asserted, the AND gate 166 transmits the PG TEST PRIVATE signal. When both inputs to the AND gate 163 are energized, the FAIL signal is transmitted.

4. Writing into a Concealed Executive Page

A concealed executive page contains the kernel program, as previously described. No program including a supervisory program is allowed to write into this area. Therefore, an AND gate 172 causes the OR gate 100 to transmit the FAIL signal if the supervisory program does try to write into a concealed page and aborts the reference.

Specifically, the AND circuit 172 receives a use characteristic signal from an AND circuit 173 indicative that a reference is to an executive page in the memory unit. The AND gate 173 transmits a TRUE signal if the MATCH signal is TRUE and an AND gate 174 transmits a TRUE signal. The AND gate 174 receives enabling signals from the AND gate 165 and inverter 164. However, an inverter 175 complements the EXEC UNPAGED signal. As a result, if there is a memory reference for an operand, the AND gate 174 transmits a TRUE signal if the central processor unit is operating in a paged executive mode, as opposed to an unpaged executive mode, during which the AND gate 117 transmits a TRUE signal. The output from the AND gate 173 is designated an EXEC PG FOUND signal.

An AND gate 176 provides the second input to the AND gate 172 if three conditions are met. The page map word must indicate that the reference is to a concealed page. This condition is provided by the output of the inverter 116. A PAGE WRITING signal indicates that the central processor unit is about to write data into the addressed location, and this is a second input to the AND gate 176. The last input is the PG TEST PRIVATE signal from the AND gate 166. Hence, the AND gate 176 transmits a TRUE signal any time a validated instruction tries to write data into a concealed page. If this occurs to a validated executive page, the AND gate 173 energizes the AND gate 172 and the OR gate 100 transmits the FAIL signal. No connection is made to the register 102.

5. Reading or Writing from a Concealed User Page

An AND gate 180 causes the OR gate 100 to transmit its FAIL signal whenever an attempt is made to read or write into a concealed user page. An AND gate 181 enables the AND gate 180 in response to a MATCH signal and a USER PAGED REF signal from an AND gate 182. The AND gate 182 is energized in response to concurrent USER REF and complemented SM VIOL and ILLEGAL ENTRY signals from AND gate 161, inverter 183 and the inverter 164, respectively. Therefore, the AND gate 180 is enabled for any reference to a validated user page.

The other input to the AND gate 180 is from a gate 184 which transmits a TRUE signal in response to the PG TEST PRIVATE signal from the AND gate 166, the complemented PUBLIC signal from the inverter 116 and a complemented BYPASS signal from an inverter 185. The central processor unit transmits the BYPASS signal when it operates on the previously discussed XCTP instructions. As a result, the AND gate 184 transmits a TRUE signal any time an instruction from a public page tries to read from or write to a location on a concealed page. If this test is met and the central processor unit is operating with a paged reference to a user area, then the FAIL signal is TRUE and the register 102 records this event.

6. Writing in a Non-Writeable Page

If a page in memory in not protected against writing operations, the "write" bit position in a corresponding page map word contains a ONE and a corresponding WRITEABLE signal is TRUE. Otherwise, the WRITEABLE signal is FALSE and any attempt to store data in a location on the page causes an AND gate 190 together with the OR gate 100 to transmit the FAIL signal. An inverter 191 couples the complement of the WRITEABLE signal to the AND gate 190. The PG WRITING signal also is applied to the AND gate 190. A final input signal is a PG TEST WRITE signal from an AND gate 192.

There are four inputs to the AND gate 192: (1) the MATCH signal; (2) the complemented ILLEGAL ENTRY signal; (3) a signal from an OR gate 193; and (4) a signal from an OR gate 194. Both OR gates 193 and 194 are energized in response to a signal from an OR gate 195. If a reference causes the USER PAGED REF signal to be TRUE, then an AND gate 196 energizes the OR gate 195 if the PG TEST PRIVATE signal is FALSE which produces a TRUE input signal from an inverter 216. An AND gate 200 produces the signal if the BYPASS and the USER PAGED REF signals are both TRUE. Another AND gate 201 energizes the OR gate 195 if the PG TEST PRIVATE signal is FALSE and the reference is to an executive page indicated by a complemented EXEC UNPAGED signal from an inverter 202 and an executive reference signal from the AND gate 165.

The OR gates 193 and 194 also provide the two enabling signals to the AND gate 192 if the PUBLIC signal is TRUE and the processor unit is operating in any paged mode. Hence, if the reference requires that the location be tested for writing and the WRITEABLE signal is FALSE, the AND gate 190 causes the FAIL signal to be transmitted.

7. Refill Errors

Another error signal which causes the OR gate 100 to generate a FAIL signal is a REFILL ERROR signal which the REFILL ERROR latch 197 transmits. As previously indicated, the operation of the circuits shown in FIG. 2 may not produce a MATCH signal. When this happens, an inverter 203 provides one enabling signal to an AND gate 204. Another signal from the AND gate 204 comes from the REFILL ERROR latch 197 when it is reset. The third input occurs when OR gate 205 receives a USER PAGED REF signal from the AND gate 182, an EXEC PAGED REF signal from the AND gate 174 or a VALID signal. The VALID signal indicates that a legal entry has been made to a memory location by one of the special XCTP instructions previously described. The existence of these signals causes the AND gate 204 to generate the REFILL signal which is applied to the inverter 122.

An AND gate 211 sets the REFILL ERROR latch 197. Either an MR RESET signal or a REG CLK signal resets the latch 197 through an OR gate 210.

The AND gate 211 provides the setting input during an asserted WRITE DONE signal if an OR gate 212 is energized, indicating no match has occurred during the refill operation. Basically, a first address conversion which does not result in a match starts a refill cycle. A WRITE pulse from the pulse generator 55 (FIG. 2) passes through the OR gate 212 to enable the AND gates 213 and 214. If, as a result of the first WRITE pulse, which loads the associative memory 26, no match occurs, the AND gate 214 keeps the OR gate 212 energized. If, by the time the WRITE DONE pulse appears, no match has occurred, the AND gate 213 keeps the OR gate 212 energized. The AND gate 211 is then energized to set the REFILL ERROR latch 197.

Whenever the REFILL ERROR latch 197 sets, then a refill cycle has terminated with no match. This causes the OR gate 100 to transmit its FALL signal.

C. VALID PAGING OPERATIONS

It is equally important to have an express indication whenever a valid reference is designated. The OR gate 101 provides this function under four sets of conditions.

1. Kernel program operations

Any unpaged executive reference is valid under conditions which do not require a private test. This, in fact, occurs when the kernel program addresses an operand in the supervisory program area. An AND gate 215 receives the EXEC UNPAGED REF signal from the AND gate 117 and, from the inverter 216, a complemented PG TEST PRIVATE signal. When energized, the AND gate 215 causes the OR gate 101 to transmit the PAGE OK signal.

2. Retrieving instructions and data from public pages and storing data on an unprotected page Another valid memory reference is one in which a memory subroutine is designated for writing data into a page which can be written into. An AND gate 217 causes the OR gate 101 to generate the PAGE OK signal in response to the PG TEST WRITE signal from the AND gate 192 together with a signal from an OR gate 220. This OR gate 220 provides an asserted output signal when the central processor unit is going to perform a reading operation, as indicated by a complemented PAGE WRITING signal from an inverter 221, or when the WRITEABLE signal is TRUE.

3. Reading operation from an executive page

A memory subroutine involving an operand on an executive page is valid so long as there is no writing involved if the operand is in the kernel area and the conditions requiring a test for a private page are met. An AND gate 222 senses these conditions to cause the OR gate 101 to transmit the PAGE OK signal. Specifically, the AND gate 222 receives four signals: (1) the EXEC PG FOUND signal from the AND gate 173; (2) the complemented PG WRITING signal from the inverter 221; (3) the PG TEST PRIV signal from the AND gate 166; and (4) the complemented PUBLIC signal from the inverter 116.

4. Special operations

A fourth valid memory reference may occur during other predetermined references. For example, an AND gate 223 receives, as one input signal, the complemented ILLEGAL ENTRY signal from the inverter 164. The other input comes from an AND gate 224. The SPECIAL signal energizes both OR gates 225 and 226 to energize the AND gate 224. Whenever the AB(18–31)=0 signal is TRUE, the OR gate 226 enables the AND gate 224 to be energized in response to a MATCH signal or a complemented SHADOW signal from an inverter 227. The SHADOW signal is exemplary of special conditions which can be designated valid references. For example, the SHADOW signal is TRUE for reference to specific areas of the previously discussed fast memory when the USER PAGE signal from the AND gate 144 is TRUE and the central processor unit is executing a XCTP instruction.

D. SYSTEM RESPONSE

All of these checks are, of course, made prior to the actual memory reference and each check is based upon the prevailing operating mode of the processor unit. Once the OR gate 101 generates a PAGE OK signal the memory subroutine circuit 28 responds and completes the reference. Whenever the OR gate 100 generates a FAIL signal, the memory subroutine circuit aborts the reference. Other conventional circuitry responds to this sequence of events. For example, the FAIL signal might trigger the use of some supervisory program to determine the cause of the failure and the corrective action to be taken.

The register 102 in FIG. 3 stores this information. Any time the FAIL signal goes TRUE, a conventional monostable multivibrator 220 produces the REG CLK signal to gate the various signals which can indicate the failure into the register 102 either directly, as shown, or in various combinations. Once this is done, the supervisory program can react based upon the information in the register 102.

Thus, in accordance with one of the objects of this invention, we have described a specific embodiment of a digital computer system which allows a single memory unit to store both public and concealed and both user and executive programs simultaneously. As the validating circuitry monitors each and every memory reference, users have considerably more flexibility without worry about the safety of their programs. Specifically, as an instruction on a public page cannot address an operand on a concealed page, a user's concealed or proprietary program is safeguarded from unauthorized use. As all these operations are performed by "wired" circuits, no significant increases in time occur so system operating times are not affected adversely.

It will also be apparent that we have disclosed one specific embodiment of a digital computer system. However, the invention itself has application in other types of systems. The specific addressing scheme is not necessary to the invention. Any addressing scheme which can, for each reference, identify various use characteristics of the addressed location will enable the validating circuit to operate. Similarly, all the disclosed operating modes are not necessary for implementing this invention. Certain specific tests are also disclosed. Not all of these tests may be used in another embodiment. Conversely, the other digital computer systems might be constructed to perform yet other tests.

FIG. 3 discloses a specific embodiment of the validating circuit. It comprises AND and OR gates and the description is made in view of a particular convention. This is done for purposes of simplifying the explanation. However, there are many different ways to implement these circuits and the logic functions they define.

Therefore, it is the object of the appended claims to cover all such variations and modifications of digital computer systems and of the validating circuit which operate in accordance with this invention.

What we claim as new and desire to secure by Letters Patent of the United States is:

1. In a data processing system including a memory unit for storing information as instructions or data in storage locations with a unique address designating each storage location and a processor unit for processing in succession instructions in the memory unit, said processor unit including means for defining a plurality of operating modes, a generator for transmitting an address to identify one of the memory locations and to initiate a memory reference, and use signal means responsive to the address generator for transmitting signals corresponding to predetermined use characteristics of the addressed location, the improvement of circuitry for checking each memory reference, said circuitry including:

A. a memory subroutine circuit in the processor unit for controlling information transfers between the processor unit and an addressed location, and B. a testing circuit comprising i. means activated upon the initiation of each memory reference for generating operating mode signals corresponding to the processor unit operating mode prevailing at that time, and ii. a validating circuit responsive to the use signal means and operating mode signal means during each memory reference and including means for enabling said memory subroutine circuit to effect a transfer when the signals corresponding to the use characteristic and prevailing operating mode indicate that the use characteristic and operating mode are compatible and means for disabling said memory subroutine circuit when they are incompatible.

2. A data processing system as recited in claim 1 wherein an instruction memory reference retrieves an instruction from the memory unit and wherein the use signal means transmits a first use characteristic signal during a memory reference to a first set of memory locations having a first restriction on the use thereof, said validating circuit including:

i. instruction monitoring means for monitoring the first use charactertistic signals corresponding to each of the successive instructions, and ii. first comparing means connected to said instruction monitoring means and responsive to the first use characteristic signals corresponding to each of the successive instructions for energizing said disabling means in said validating circuit.

3. A system as recited in claim 2 wherein said processor unit includes an instruction decoder and wherein:

A. said instruction monitoring means includes:

i. first bistable means conditioned to a first state by the first use characteristic signal corresponding to a current instruction in the processor unit, and ii. second bistable means conditioned to a first state by the first use characteristic signal corresponding to a preceding instruction which was in the processor unit, and B. said first comparing means includes:

i. means connected to said first and second bistable means for generating an error signal when said first bistable means is in its first state and said second bistable means is in its second state, said validating circuit disabling means being responsive to the error signal, and ii. means coupled to the instruction decoder for disabling said error signal generating means in response to the processing of a preselected instruction.

4. A system as recited in claim 2 wherein an operand memory reference transfers data between the memory unit and processor unit, said validating circuit additionally comprising:

A. operand monitoring means for monitoring other use characteristic signals during operand memory references, and B. second comparing means connected to said operand monitoring means and responsive to the other use of characteristic signals and operating mode signals for energizing said disabling means in said validating circuit.

5. A system as recited in claim 4 wherein the memory unit stores a plurality of programs each comprising a plurality of instructions, said second comparing means including means connected to said instruction monitoring means and said operand monitoring means for energizing said disabling means in said validating circuit.

6. A system as recited in claim 4 wherein

A. said use signal means includes means for transmitting a second use characteristic signal when data can be transferred to the corresponding location, B. said operating mode signal generating a WRITING signal when an operand memory reference is to transfer data to a location, and C. said second comparing means including means responsive to the WRITING signal and the absence of the second use characteristic signal for energizing said disabling means in said validating circuit.

7. A system as recited in claim 4 wherein said memory unit stores instructions grouped as programs, at least one program being designated a control program, A. said use signal means includes means for transmitting a third use characteristic signal when an addressed location contains a control program, B. said processor unit operating mode signal generating means including means for transmitting a CONTROL PROGRAM operating mode signal when processing control programs.

8. A system as recited in claim 7 wherein:

A. said operating mode signal generating means includes means for transmitting a WRITING signal when an operand memory reference is to transfer data to a memory location, and B. said second comparing means includes means responsive to the WRITING signal and the first and third use characteristic signals for energizing said disabling means in said validating circuit.

9. A system as recited in claim 7 wherein said second comparing means includes a means responsive to the first use characteristic signal and the absence of the third use characteristic signal during an operand memory reference for energizing said disabling means in said validating circuit.

10. A system as recited in claim 1 wherein the memory locations are grouped in executive and user pages and an address defines a page and location on the page, wherein the address generator includes paging means for storing paging information including the use characteristics of that page and wherein said use signal means is connected to said paging means for transmitting a first use characteristic signal when the availability of the page is restricted, said validating circuit comprising:

i. instruction monitoring means for monitoring the first use characteristic signal corresponding to each of the successive instructions, and ii. first comparing means responsive to the first use characteristic signals corresponding to each of the successive instructions for energizing said disabling means in said validating circuit.

11. A system as recited in claim 10 wherein an operand memory reference transfers data between the memory unit and processor unit, said use signal means transmitting a second use characteristric signal when a different restriction exists for the use of the information on the page, said validating circuit additionally comprising:

i. operand monitoring means for monitoring the use characteristic signals during operand memory references, and ii. second comparing means responsive to the use characteristic and operating mode signals during an operand memory reference for energizing said disabling means in said validating circuit.

12. A system as recited in claim 10 wherein said paging means stores only a portion of the paging information, the memory unit having locations for storing all paging information and wherein the address generator includes refill means for transferring new paging information into the paging means, said validating circuit additionally comprising:

i. means monitoring the refilll means and paging means for generating an error signal if, after a paging information transfer, the paging means does not contain appropriate paging information, and ii. means responsive to the error signal from said refill monitoring means for energizing said disabling means in said validating circuit.

13. A system as recited in claim 12 wherein an operand memory reference transfers data between the memory unit and processor unit and said validating circuit additionally comprises:

i. operand monitoring means for monitoring the use characteristic signals during operand memory references, and ii. third comparing means including means for energizing said enabling means in said validating circuit in response to comparable use characteristic and operating mode signals.

14. A system as recited in claim 13 wherein the memory locations are grouped in pages, certain programs being designated control programs, at least one control program including unpaged instructions which produce specific addresses, A. said operating mode signal generating means generating an unpaged operating mode signal during the processing of unpaged instructions, and B. said third comparing means including means responsive to the first use characteristic signal and the unpaged operating mode signal for energizing said enabling means in said validating circuit.

15. A system as recited in claim 13 wherein the use signal means includes means for transmitting a second use characteristic when data can be transferred to that memory location, A. said operating mode generating means including means for generating a WRITING signal during a memory reference for transferring data to a memory location, B. said third means including means responsive to the first value of the second use characteristic signal during an operand memory reference and the absence of the first use characteristic signal from said instruction monitoring means for energizing said enabling means in said validating circuit.

16. A system as recited in claim 13 wherein the memory locations are grouped in pages, each page storing at least one program and at least one program being designated a control program, and at least one program being located on a page which causes the use signal means to transmit the the first use characteristic signal, A. said operating mode generating means including means for generating a signal during an operand memory reference when data is to be transferred fron a memory location, B. said third comparing means including means responsive to the first use characteristic signal during an operand memory reference and the READING signal for energizing the enabling means in said validating circuit.

* * * * *